(12) United States Patent
Wu

(10) Patent No.: US 12,737,346 B2
(45) Date of Patent: Sep. 15, 2026

(54) POINT IN TIME DATA STORAGE

(71) Applicant: PayPal, Inc., San Jose, CA (US)

(72) Inventor: Haifeng Wu, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 19/039,010

(22) Filed: Jan. 28, 2025

(65) Prior Publication Data

US 2026/0147748 A1 May 28, 2026

(30) Foreign Application Priority Data

Nov. 22, 2024 (WO) ................ PCT/CN2024/133690

(51) Int. Cl.
*G06F 16/23* (2019.01)
*G06F 16/22* (2019.01)

(52) U.S. Cl.
CPC ...... *G06F 16/2365* (2019.01); *G06F 16/2282* (2019.01)

(58) Field of Classification Search
CPC ......................... G06F 16/2365; G06F 16/2282
See application file for complete search history.

(56) References Cited

U.S. PATENT DOCUMENTS 11,182,372 B1 * 11/2021 Jain ....................... G06F 16/178
11,494,394 B2 11/2022 Bui et al.
11,797,600 B2 * 10/2023 Mazar .................... G06Q 40/12
11,853,318 B1 12/2023 He et al.
11,941,014 B1 * 3/2024 Das ....................... G06F 16/219
12,032,585 B2 7/2024 Xie et al.
2018/0060341 A1 3/2018 Wu et al.
2019/0095453 A1 * 3/2019 Whitmer ............. G06F 11/1458
2020/0073763 A1 3/2020 Saini et al.
2020/0133781 A1 * 4/2020 Reddy Av ........... G06F 11/1469
2020/0167360 A1 * 5/2020 Rath ..................... G06F 16/278
2020/0167361 A1 * 5/2020 Princehouse ......... G06F 3/0649
(Continued)

FOREIGN PATENT DOCUMENTS

CN 116166849 A 5/2023
CN 116720938 A 9/2023

OTHER PUBLICATIONS

International Search Report and Written Opinion for Application No. PCT/CN2024/133690 mailed on Feb. 8, 2025, 8 pages.

*Primary Examiner* — Dangelino N Gortayo
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to maintaining a point in time (PIT) database. A database system updates a snapshot table included in the PIT database according to a snapshot table time-to-live (TTL) value of 3K/2. In some embodiments, the updated snapshot table is configured to provide accurate data for queries up to K years prior to points in time at which the queries are executed. The system may update a binlog table included in the PIT database according to a binlog table TTL value of K. The system may receive a request to access PIT data stored in the PIT database. Based on a timestamp specified in the request, the system may access the PIT database. The system transmits a set of PIT data that corresponds to the timestamp and includes accurate data for K years prior to the timestamp.

20 Claims, 9 Drawing Sheets

(56) References Cited

U.S. PATENT DOCUMENTS

2020/0364201 A1 11/2020 Cseri et al.
2021/0240582 A1* 8/2021 Khandkar ........... G06F 11/1469
2021/0382863 A1 12/2021 Munipalle

* cited by examiner

Configuration Table 210

| K Value 212 | Snapshot Dump Value 214 (Every K/2 Years) | PIT Binlog TTL 216 (K Years) | PIT Snapshot TTL 218 (3K/2 Years) |
|---|---|---|---|
| 1 | 0.5 | 1 | 1.5 |
| 2 | 1 | 2 | 3 |
| 5 | 2.5 | 5 | 7.5 |
| 10 | 5 | 10 | 15 |
| ⋮ | ⋮ | ⋮ | ⋮ |

Fig. 2

Production

Point in Time

Example Binlog Table Entry 332

| Field 302 | Value 304 |
| --- | --- |
| Process Time | July 12, 2024 |
| Database Operation | upsert |
| Primary Key | 6523455677888890655 |
| Data Field | name |
| Data Value | Larry |

Fig. 3B

Method 700

Maintain a point in time (PIT) database.
710

Update a snapshot table included in the PIT database according to a snapshot table time-to-live (TTL) value of 3K/2, where the updated snapshot table is configured to provide accurate data for queries up to K years prior to PITs at which the queries are executed, and where K is a number of years greater than or equal to one.
720

Update a binlog table included in the PIT database according to a binlog table TTL value of K.
730

Receive, from a computer system, a request to access PIT data stored in the PIT database.
740

Access, based on a timestamp specified in the request, the PIT database.
750

Transmit, to the computer system, a set of PIT data that corresponds to the timestamp specified in the request and includes accurate data for K years prior to the timestamp specified in the request.
760

Fig. 7

Method 800

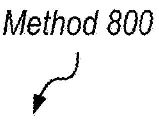

Execute, according to a snapshot dump time-to-live (TTL) calculated using a first algorithm, a dump of production snapshots stored in the production database into the point in time (PIT) snapshot table of the PIT database, where a given snapshot stores a plurality of binlogs.
810

Update, according to a PIT snapshot TTL calculated using to a second algorithm, the PIT snapshot table.
820

Update, according to a PIT binlog TTL calculated using to a third algorithm, the PIT binlog table.
830

During the executing, the updating the PIT snapshot table and the updating the PIT binlog table, service a plurality of queries for data stored in the PIT database.
840

Access the PIT database at least to retrieve a latest snapshot, corresponding to a point in time prior to a timestamp specified in the given query, from the PIT snapshot table and one or more binlogs, corresponding to points in time between the latest snapshot and the timestamp, from the PIT binlog table.
850

Fig. 8

POINT IN TIME DATA STORAGE

PRIORITY CLAIM

The present application claims priority to PCT Appl. No. PCT/CN2024/133690, entitled "Point in Time Data Storage," filed Nov. 22, 2024, which is incorporated by reference herein in its entirety.

BACKGROUND

Technical Field

This disclosure relates generally to techniques for storing data, and, more specifically, to managing a database system storing both production and point in time data.

Description of the Related Art

In various database management scenarios, a database may store data in both an online database and an offline database. Management of these two types of data storage, however, differs in the amount of time the data is retained in storage, the types of data stored, the amount of data stored, etc. For example, data storage in an online database generally includes storage of a single copy of various records that are generated for several years. As one example, an online database may store records for various entities for 5, 15, 20, etc. years. In contrast to an online database, an offline database may store a history of changes made to the records of the online database, but for a smaller amount of time, such as 1, 2, 3, etc. years. The smaller range of time of offline data storage is often due to the larger storage capacity required for storing the online database record itself as well as the history of changes made to this record at different points in time. For example, a given record may be changed by an end user ten times over a period of two years. As such, the offline database stores the given record (which has been changed ten times) as well as data indicating the ten times this record was changed. As one specific example, a user, John Doe may create an account with a processing system implementing an online and offline database management system. In this example, over the span of five years, John Doe changes his email address on his account three different times. The database management system stores a copy of the account record for John Doe that includes an initial email address as a record in the online database. Further, each time John Doe changes his email address, the system stores a record indicating this change in the offline database and updates the record stored in the online database to replace the initial email address with the updated email address. Accordingly, the storage needs and capacities of the online and offline databases differ. For example, the offline database often stores a greater amount of data than the online database.

BRIEF DESCRIPTION OF THE DRAWINGS

FIG. 2 is a diagram illustrating an example table storing configuration algorithms and examples, according to some embodiments.

FIG. 3B is a diagram illustrating an example binlog table entry, according to some embodiments.

FIG. 7 is a flow diagram illustrating an example method for maintaining a PIT database according to customized TTL values, according to some embodiments.

FIG. 8 is a flow diagram illustrating an example method for servicing PIT database queries while maintaining PIT and production databases according to customized TTL values, according to some embodiments.

DETAILED DESCRIPTION

Figure 1:
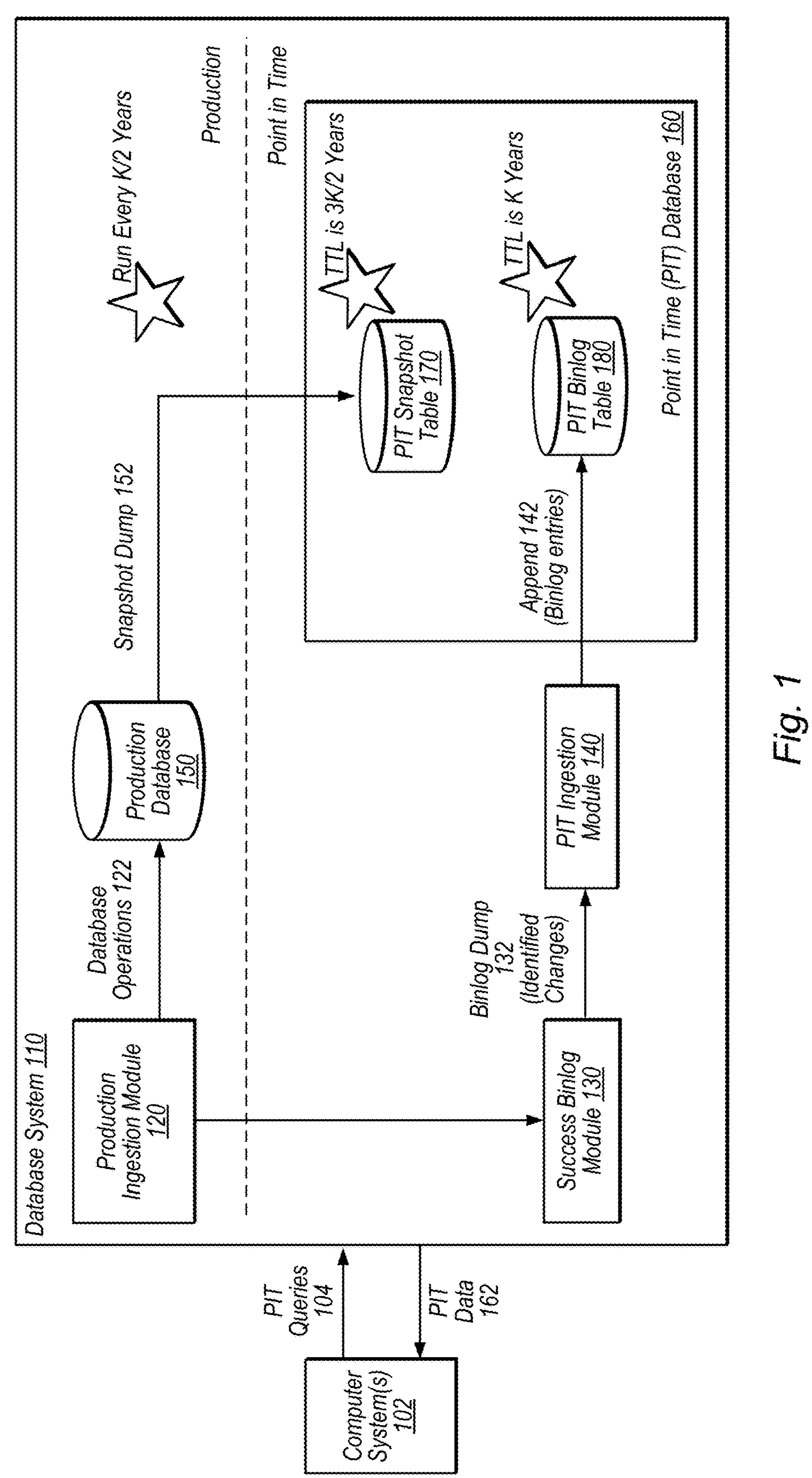
FIG. 1 is a block diagram illustrating an example database system configured to maintain a point in time (PIT) database, according to some embodiments.

Database systems generally store data in the form of records. After initial generation in the database, a database record may be altered and updated on multiple occasions over a long period of time. A database system stores such records in a production database for a period that spans multiple years and updates these records as requests to perform database operations are received. For example, the database system generates a record for John Doe in 2023 and then, one year later (i.e., in 2024) receives a request to update an email address stored in the John Doe record. In this example, the database system updates the record for John Doe to reflect the new email address such that the record that is one year old now only stores the new email address and no longer stores the older email address. In addition to storing and maintaining records in a production database, the database system stores point in time (PIT) records in a PIT database indicating changes made to records in the production database. In this way, the PIT database is an audit trail for the production database. In the John Doe production record example, when a change is made in 2024 to the John Doe record to update the email address listed in the record, a PIT record is created and stored in the PIT database that indicates this change made in 2024 to the John Doe record. In such database storage scenarios, however, the storage requirements for the production and PIT databases differ. For example, since production data storage includes the storage of current data values, such as user records, this information requires a long lookback. Production data is often stored for 5, 10, 30, etc. years, while PIT data is generally only stored for a portion of the amount of time the production data is stored.

The differing storage requirements are due to the different uses of the production data versus PIT data. For example, production data stores information for various clients, where the client data often needs to be available for many years when these clients hold an account with the system managing the production data. In contrast, PIT data is often used to train analysis and prediction systems, such as those executing a machine learning model. For example, historical changes in a user's attributes over time, indicated in PIT data, are useful in training machine learning models to make predictions about how this user will behave going forward. In particular, the PIT database allows for a lookup within the last two years, at any point in time, which includes a look up and reconstruction of any data at that point in time. For example, a query performed on the PIT database for data from 6 months ago, will return John Doe's new email address, while a request from a year ago (i.e., 2023) will return John Doe's old email address. In this way, the PIT database provides old versions of data by storing changes made to production records.

To reduce the amount of data stored in both the production database and the PIT database, the disclosed database system implements binlogs and snapshots. For example, the disclosed database system captures a production snapshot from a year ago of a given record stored in the production database 150, as discussed in further detail below with reference to FIG. 1. This snapshot includes multiple different attributes for a given entity (e.g., 100 attributes of a user, including name, phone number, email address, etc.) and is associated with a particular private key of the given entity. When implementing the PIT database, however, instead of capturing a PIT snapshot of the entire record, the database generates a binlog. This binlog is a changelog indicating a change made to one or more attributes stored in the given record. In addition, the database system stores a copy of the production snapshots in the PIT database during a snapshot dump process discussed in further detail below with reference to FIG. 1.

As used herein, the term "binlog" is intended to be construed according to its well-known meaning, which includes information that indicates a change made to a given database record. For example, binlogs provide an audit trail of changes made to database records. Various binlogs are generated and stored when operations are performed on a database, where these binlogs represent changes made by the database operations. For example, an upsert database operation updates a database record by inserting a new value into one or more fields of the database record. In this example, the upsert database operation may result in the database system generating one or more binlogs indicating the new value added to the one or more fields of the database record. A binlog may also be referred to as a journal, in various embodiments.

As used herein, the term "snapshot" is intended to be construed according to its well-known meaning, which includes information that indicates a state of a database record at a given point in time. In contrast to a binlog, which refers to one or more changes made to a given field in a database record, a snapshot is generally derived from an initial state (which in some situations might be empty) of a database record combined with a later state for this database record produced after replaying one or more binlogs generated after the initial state of the database record. For example, for account A, an initial record state is: {name: Jim, age: 18, company: PayPal, address: 123XYZ}. As time progresses, this record will have multiple binlogs generated for it (as changed are made to the record). For example, at time t1 a first binlog generated for this record shows that the name field has been changed from Jim to Tom, and the age field for this record has changed from 18 to 19. Further in this example, at time t2, a second binlog generated for this record shows that the city listed in the address has changed from XYZ to ABC. In this example, if the disclosed database system needs to generate a snapshot at time t2, then the system applies the first and second binlogs to the initial state of the example database record in order to get the status of all fields for this record at the point in time t2. That is, the snapshot of this record at time t2 is: {name: Tom, age: 19, company: PayPal, address: 123ABC}. As discussed below with reference to FIG. 1, database system 110 may generate new snapshots by replaying a plurality of binlog records on top of a previously generated snapshot.

The disclosed database system periodically generates both snapshots and binlogs as changes are made to records stored by the database. For example, if an email address stored in the given record is changed, then the database system generates a binlog for this change. The binlog stores information indicating that the email address changed 6 months ago and does not store other attributes of the given record since these other attributes were not changed (i.e., the binlog does not store the name, email address, phone number, etc. for the given record). In this example, if the database system performs a point in time lookup (e.g., a query) for three months ago, the system will retrieve the production snapshot captured for the given record a year ago. The system also retrieves binlogs for the given record indicating changes made between a current time and the timestamp of the production snapshot (i.e., a year ago). That is, the system retrieves a binlog entered six months ago indicating that the email address of the given record was changed. After retrieving the production snapshot and the binlog from six months ago, the database system combines the snapshot and the binlog to generate a database record that includes up-to-date information for a point in time three months ago. This combination process is discussed in further detail below with reference to FIG. 4.

To further optimize data storage, the disclosed database system may implement native time-to-live (TTL) values which cause databases to delete records whose timestamps are older than a native TTL value. As one example, if a native TTL value for the production database is 30 years, then the database system will delete any records with timestamps that are more than 30 years old. Similarly, in this example, if a native TTL value for the PIT database is two years, then the database system will delete any PIT records with timestamps that are more than two years old. While native TTL values often work well for production data storage, these values often introduce problems in the PIT database.

As discussed in further detail below with reference to FIG. 5, implementing a native TTL value for snapshots and binlogs stored in the PIT database causes issues in terms of the data available in the PIT database. For example, while the production database stores data for 30 years (according to the native production TTL value of 30), the PIT database deletes records of changes after two years (according to the native PIT TTL value of 2). In this example, if a record from 15 years ago is retrieved from production but there was a change made to this record three years ago, then the database system will not be able to see a record of this change in the PIT database. Instead, the system will retrieve an outdated record because the PIT database does not have a record of a change that occurred three years ago. In this example, if a record has not been changed within the past two years (which corresponds to the PIT TTL value of 2), then no information about that record will be available in the PIT database. An example data miss caused by the native TTL implementation is discussed in detail below with reference to FIG. 5.

To address the PIT database storage problem described above, the disclosed techniques maintain a multi-storage database system using customized time-to-live values and customized timing for copying data from one storage mechanism of the database system to another. In order for the PIT database and the production database queries to produce matching results in addition to the Pit database to reduce its storage capacity (e.g., only store data from 2 years ago), the disclosed system determines database management values. For example, the database system calculates unique TTL values for the PIT snapshot table and the PIT binlog table, as well as a unique value for the timing of the snapshot dump from the production database to the PIT snapshot table. For example, the disclosed database system calculates these customized values using different algorithms, discussed in further detail below with reference to FIG. 2. The database system calculates these unique TTL values and a snapshot dump value based on a parameter, K, that is a number of years greater than or equal to one.

The customized values for managing a PIT database provide for faster lookups in the PIT database while also allowing for smaller storage capacity for the PIT database. The smaller storage capacity requirements, in turn, may advantageously decrease computational (and therefore financial) costs for maintaining the PIT database. For example, the disclosed database management techniques save on storage costs by only storing a customized number of years of historical data in PIT data storage. In addition, the customized database management values also provide accurate queries performed on the PIT data storage. For example, queries performed on the PIT database produce the same accurate values as queries on the production database. Further, the disclosed techniques may advantageously improve the accuracy of data stored by the database, particularly PIT data. This, in turn, may improve the accuracy of models (e.g., regression models) trained on the PIT data, which may improve predictions generated by systems utilizing the data stored by the disclosed database system. The disclosed time-to-live values may advantageously improve queries performed by database systems on point in time data stored by a PIT database. For example, due to the customized parameters of the PIT database, PIT queries retrieve accurate data for K years prior to points in time at which the queries are executed.

Example PIT Database System

FIG. 1 is a block diagram illustrating an example database system configured to maintain a point in time (PIT) database. In the illustrated embodiment, a system 100 includes one or more computer systems 102 and a database system 110, which in turn includes production ingestion module 120, production database 150, success binlog module 130, PIT ingestion module 140, and point in time (PIT) database 160. Further in the illustrated embodiment, PIT database 160 includes PIT snapshot table 170 and PIT binlog table 180, which store snapshots from production database 150 and binlog entries from database operations 122, respectively.

In various embodiments, database system 110 ingests queries using production ingestion module 120. For example, database system 110 receives requests from one or more computer systems 102 or one or more other systems, such as end user devices, to access production database 150. In various embodiments, production database 150 stores a history of X number of years of data for a plurality of entities. As one example, production database 150 stores 30 years of production data for a plurality of end users. As discussed above, PIT database 160 stores a history of changes made to records stored in production database 150. As discussed in further detail below, PIT database 160 stores a history of data in PIT snapshot table 170 and PIT binlog table 180, according to unique TTL values calculated for these two tables by database system 110. In various embodiments, requests received by database system 110 include requests to add data to, read data from, update data stored in, or delete data stored in the production database 150. These actions are generally referred to as CRUD operations. Database system 110 may implement production database 150 or PIT database 160 using any of various types of distributed, scalable object stores, including cloud-based distributed databases. For example, databases 150 and 160 are implemented using one or more of the following types of databases: Apache Hbase™, Apache Cassandra™, MongoDB™, Google BigQuery™, Amazon DynamoDB, etc.

In the illustrated embodiment, production ingestion module 120 periodically ingests requests to access production database 150 and executes database operations 122 on production database 150 according to the requests. For example, production ingestion module 120 may ingest requests in real-time as they are received (e.g., executes one or more database operations based on a single request as it is received) or may ingest requests in batches (e.g., module 120 may wait until it has a set of multiple requests before proceeding with execution). In the illustrated embodiment, after executing database operations 122 on production database 150, production ingestion module 120 periodically sends a list of the database operations 122 to success binlog module 130. This list may indicate which of the database operations 122 were successful and which ones failed. For example, production ingestion module 120 publishes binlogs to point in time storage system by sending a stream of binlogs to success binlog module 130. For example, whenever system 110 makes a change in production database 150, production ingestion module 120 will push a message with a binlog indicating this change to success binlog module 130.

In the illustrated embodiment, success binlog module 130 identifies which operations in the list were successful. Based on identifying which operations were successful, success binlog module 130 periodically performs a binlog dump 132 that includes the identified successful changes made to production database 150. This binlog dump 132 is ingested by PIT ingestion module 140. PIT ingestion module 140 generates a set of binlogs corresponding to each of the identified successful changes included in binlog dump 132. In the illustrated embodiment, PIT ingestion module 140 performs an append operation 142 to append the set of binlog entries to PIT binlog table 180 stored in PIT database 160. As used herein, the term "periodically" as used herein is intended to be construed according to its well-understood meaning, which includes regularly occurring intervals of time at which actions are performed. For example, PIT ingestion module 140 runs a daily load of binlogs received via binlog dump 132 into PIT binlog table 180 during append operation 142. Additionally, in some embodiments, PIT ingestion module 140 generates a snapshot and stores this snapshot in PIT snapshot table 170. For example, if a given database record has more than 20 changes (according to binlogs in dump 132), then PIT ingestion module 140 will generate a snapshot based on the binlogs included in dump 132 and a most recent previous snapshot for the given database record and save it in PIT snapshot table 170. Module 140 may access PIT snapshot table 170 to retrieve the most recent previous snapshot for the given database record in order to generate a new snapshot. In this way, PIT snapshot table 170 has two periodic data sources: snapshot dump 152 and new snapshots generated by PIT ingestion module 140. As one example, snapshot dump 152 occurs according to the selected value of K as discussed in further detail below (e.g., yearly, if K=2) and new snapshots are generated daily, weekly, monthly, etc.

In the illustrated embodiment, database system 110 receives one or more PIT queries from one or more computer systems 102. In various embodiments, one or more computer systems 102 correspond to data analysts or system administrators of system 100. These analysts and administrators utilize PIT data stored by database system 110 to train one or more prediction models (e.g., regression models). For example, a data analyst submits a PIT query 104 to database system 110 that specifies a point in time one year ago from which to retrieve data. In response, the data analyst receives a set of PIT data 162 from database system 110 that corresponds to the point in time specified in query 104 that was submitted by the analyst. In various embodiments, database system 110 retrieves set of PIT data 162 from PIT database 160 according to the replay process discussed in detail below with reference to FIG. 4.

In some situations, a data analyst submits multiple PIT queries 104 for different points in time. For example, the data analyst submits a second PIT query 104 for a point in time one month ago. In this example, the analyst is then able to process the PIT data for prediction purposes, such as training a model to predict data attributes for a future point in time based on how these data attributes changed from one year ago to one month ago. The model training discussed in this example is advantageously performed using the up-to-date PIT data provided by the disclosed customized PIT database. Training using up-to-date PIT data is advantageous over utilizing data stored in production database 150, as production variables are static variables that do not provide context for how these variables have changed over time. In contrast, using PIT variables from different points in time may advantageously improve predictions provided by regression models trained on how these PIT variables have changed over time. Computer systems 102 may train one or more of the following types of regression models: linear regression, logistic regression, non-linear regression, polynomial regression, random forest regression, decision trees (e.g., a gradient boosted decision tree), neural networks, etc.

In various embodiments, database system 110 performs a snapshot dump 152 from production database 150 to PIT snapshot table 170 stored in PIT database 160. The snapshot dump 152 is a full dump of a plurality of snapshots of data stored in production database 150. In this way, database system 110 captures snapshots of data stored in production database 150 as it changes over time. Specifically, database system 110 performs snapshot dump 152 according to a snapshot dump value determined by database system 110 using a customized algorithm. For example, database system calculates a snapshot dump value for production database using the algorithm K/2 years, as discussed in further detail below with reference to FIG. 2. In this algorithm, K is a number greater than or equal to zero. As one example, if the value of K is 4, then database system 110 determines to perform a full snapshot dump 152 from production database 150 every 4/2 years (i.e., every 2 years). As discussed above, the value of K may be selected in various ways. For example, the value of K is selected in one or more of the following ways: manually by a system administrator of database system 110, manually by an analyst utilizing PIT data stored by database system 110 to train models, and automatically based on points in time specified in a plurality of previously submitted PIT queries 104 received by database system 110. As one example, database system 119 may automatically select the value of K based on an average point in time or an oldest point in time specified in PIT queries 104.

When performing snapshot dump 152, database system 110 converts production snapshots captured in production database 150 to PIT snapshot format. For example, database system 110 alters and updates the primary keys of production snapshots included in dump 152 to conform to a primary key (PK) format of the PIT snapshot table 170. As discussed in further detail below with reference to FIG. 3A, database system 110 updates the primary key of a production snapshot to include a salt value as well as a point in time value (i.e., a timestamp) before storing the snapshot in the PIT snapshot table 170.

In addition to calculating a value for performing snapshot dump 152, database system 110 calculates unique TTL values for PIT snapshot table 170 and PIT binlog table 180, respectively. Further, database system 110 maintains these tables 170 and 180 according to their unique TTL values. For example, database system 110 calculates these TTL values using the same K value used to calculate the snapshot dump value discussed above. In the illustrated embodiment, algorithms are shown for calculating the TTL values for tables 170 and 180. In the illustrated embodiment, the algorithm for calculating the PIT snapshot TTL value is shown as 3K/2 years. In the example discussed above with reference to calculating the snapshot dump value, if the value of K is selected to be 4, then database system 110 calculates the PIT snapshot TTL value as 3(4)/2 years (i.e., 6 years). Similarly, database system 110 calculates the PIT binlog table TTL value as 4 years (based on the K value being 4). As discussed in further detail below with reference to FIG. 3A, in addition to performing a snapshot dump 152 according to a calculated dump value, database system 110 periodically generates PIT snapshots for storage in PIT snapshot table 170 based on binlogs stored in PIT binlog table 180.

In addition to improving on storage capacity needs, the disclosed snapshot dump from production to the PIT database according to customized timing may advantageously reduce data loss in the PIT database. For example, the production portion of the disclosed database system publishes binlogs from production to the PIT portion of the disclosed database system. This publication may be performed using Kafka™, for example. In some situations, data is lost during this publication process, which leads to various binlogs (and their corresponding record changes) going missing. In such data loss situations, snapshots generated by the PIT database after these binlogs are lost are likely inaccurate due to missing changes provided by the lost binlogs. As such, the disclosed snapshot dump from production to the PIT database allows the PIT database to correct any fields affected by previous binlog issues (i.e., the snapshots dumped from production will provide up-to-date records).

Note that using PIT data stored in PIT database 160 to train regression models is one non-limiting example embodiment of the analysis and decisioning that may be performed by various computer systems 102 (or other systems) using PIT data stored by database system 110. In various embodiments, computer systems may use PIT data for any of various purposes, including: using PIT data to perform quality assurance regression for various code changes, explore how to create new variables that describe changes over time (e.g., if one field of a user's record identifies the names of this user's friends, then the disclosed PIT data will show how this person's friendships change over time), etc.

In this disclosure, various "modules" operable to perform designated functions are shown in the figures and described in detail (e.g., production ingestion module 120, success binlog module 130, PIT ingestion module 140, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. The term "engine" may also be used interchangeably with the term "module" herein. For example, as used herein, the term "replay engine" refers to a set of software instructions that are executable by a database system, such as database system 110, for example.

Example TTL Configurations

FIG. 2 is a diagram illustrating an example time-to-live (TTL) configuration table storing configuration algorithms and examples. In the illustrated embodiment, a table 210 of algorithms for calculating TTL configurations for different portions of the disclosed database system as well as example calculated TTLs are shown. Table 210 includes four columns: a K value column 212, a snapshot dump value column 214, a PIT binlog TTL column 216, and a PIT snapshot TTL column 218. Note that while FIG. 2 shows four illustrated rows storing various values for columns 212, 214, 216, and 218 of table 210. In various embodiments, table 210 may include any number of rows storing additional values calculated for columns 214, 216, and 218, based on the corresponding K value stored in column 212.

In the illustrated embodiment, the first row of table 210 stores a K value of 1 in column 212, a snapshot dump value of 0.5 in column 214, a PIT binlog TTL of 1 in column 216, and a PIT snapshot TTL of 1.5 in column 218. For example, for the K value of 1, the disclosed database system (e.g., system 110) calculates a snapshot dump value using the algorithm of K/2 years, which is 1/2 years, resulting in the snapshot dump value of 0.5 years. This value indicates that database system 110 discussed above with reference to FIG. 1 will dump snapshots from production database 150 to PIT snapshot table 170 in the PIT database 160 every six months (i.e., 0.5 years). Similarly, for the K value of 1, the disclosed database system calculates a PIT binlog TTL of K years, which results in a PIT binlog TTL of 1 year. Based on this TTL value, database system 110 deletes binlog records from the PIT binlog table 160 once they are more than a year old. For example, PIT database 160 only stores binlog records from the past year. Further in this example, the disclosed database system calculates a PIT snapshot TTL value of 3K/2 years, which results in a PIT binlog TTL of 1.5 years when the K value in column 212 is 1 (i.e., 3*1/2 is 3/2). Accordingly, database system 110 will delete records from the PIT snapshot table 170 when their timestamps are from a time more than 1.5 years before a current time. For example, PIT snapshot table 170 only stores snapshots from the past year and a half.

As shown in the additional rows of table 210, database system 110 calculates various values for columns 214, 216, and 218 based on the K values in column 212 of 2, 5, 10, etc. For example, the PIT snapshot TTL value when the K value is 5 is calculated by the disclosed database system to be 7.5 years. Similarly, the PIT snapshot TTL value, when the K value is 10, is calculated to be 15 years. As discussed above with reference to FIG. 1, the K value stored in column 212 may be selected in various ways. For example, database system selects or alters K value 212 using one or more of the following methods: manually selected by an administrator of system 100, manually selected by a user of one of computer systems 102, automatically calculated using a machine learning model, etc. In various embodiments, the value K may be selected according to different use-case requirements. For example, if a company training models only uses the most recent two years of historical data, then this company would select K to be "2" and then the disclosed database system determines the TTL values for corresponding data retention within the PIT database. In the context of PayPal, user activity trends may change over time, so the latest PIT data can demonstrate new trends in recent user activity e.g., fraudulent user activity in the past few months. In contrast, in the context of PayPal, a few months user activity being used to train models is generally not enough data to train a robust model; as such, model training may require multiple years of historical data. Accordingly, in this example, the database system determines that two or more years of PIT data should be stored in the PIT database and selects the value of K accordingly.

Example Production and PIT Schemas

Figure 3A:
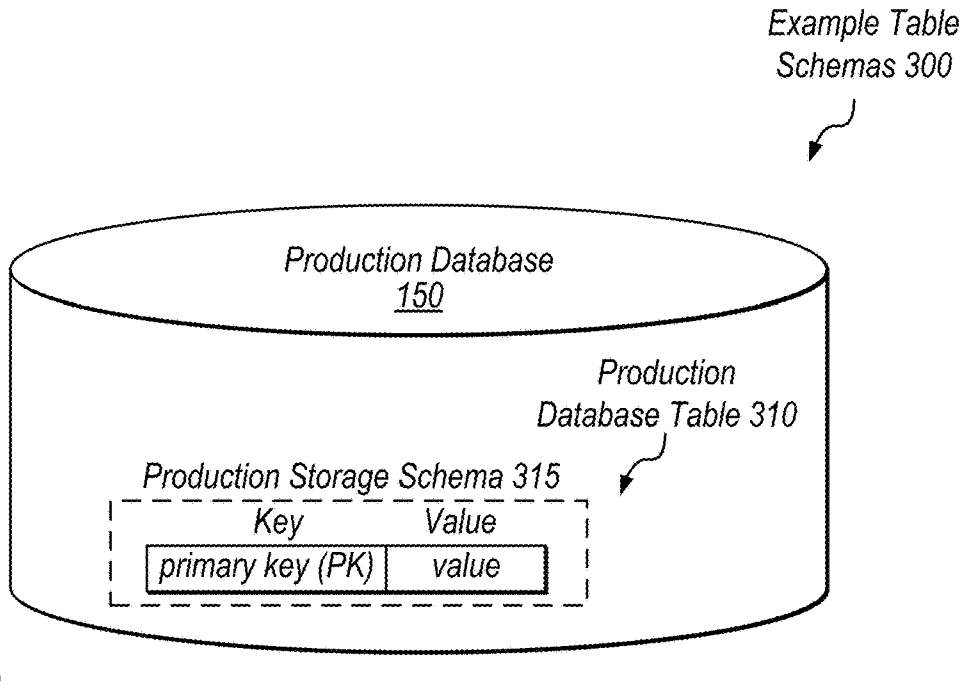
FIG. 3A is a block diagram illustrating example table schemas, according to some embodiments.
Figure 3A:
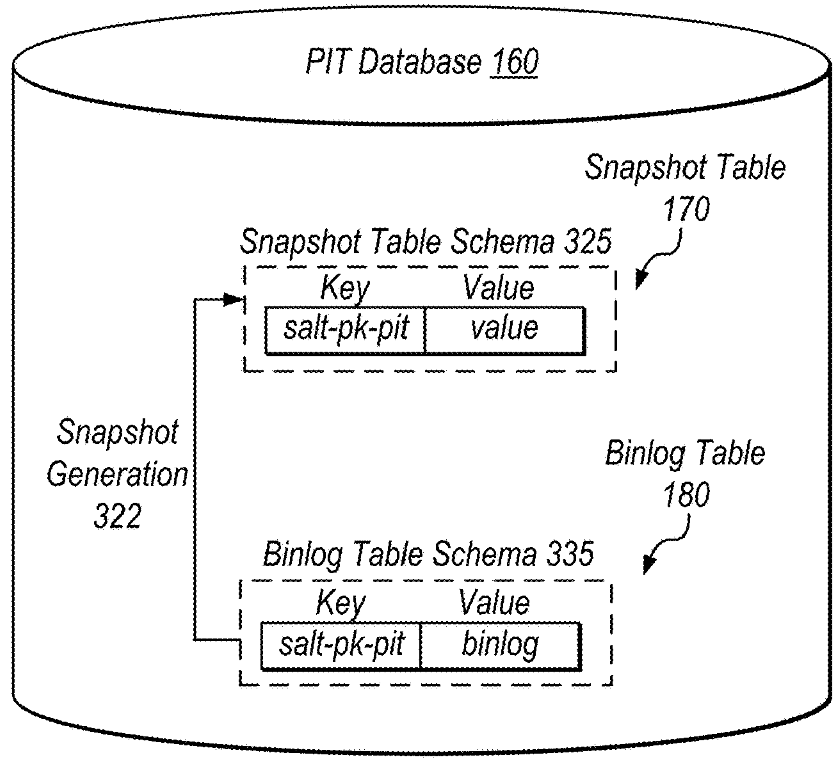

FIG. 3A is a block diagram illustrating example table schemas. In the illustrated embodiment, example table schemas 300 are shown for tables, stored in both production and PIT portions of database system 110 discussed above with reference to FIG. 1.

In the illustrated embodiment, production database 150 includes production database table 310, which conforms to a production storage schema 315. For example, table 310 is formatted according to schema 315 which includes storing production records as key-value pairs. These key-value pairs include primary keys and corresponding values. The primary keys of production storage schema 315 includes unique identifiers of entities corresponding to the records stored in table 310. For example, a given entry in production database table 310 includes a primary key that is a unique identifier of a particular user. The values stored in table 310 include values of attributes of various entities. As one example, these attributes are user attributes, such as a user's name, an account name, a company name, an account number, etc. Value entries stored in production database table 310 may also include attributes of clients or companies, such as a total transaction volume, types of transactions, types of clients, card number, IP address, session identifier, receiver account, platform, etc.

PIT database 160, in the illustrated embodiment, stores two different tables, snapshot table 170 and binlog table 180, as discussed above with reference to FIG. 1. PIT database 160 stores snapshots in snapshot table 170 according to a snapshot table schema 325. For example, snapshot table schema 325 stores PIT snapshots in key-value form, with a key made up of a salt value, a primary key, and a point in time (e.g., a timestamp), with a corresponding data value (which is made up of values of various entity attributes stored in production database 150). The salt value included in the primary key of snapshot table 170 entries is a random number which accounts for partitions within the different regions of distributed PIT database 160. For example, PIT database 160 calculates a given salt value as a hash of the primary key value for a given snapshot table 170 entry. In this way, the salt values added to the keys of snapshot table 170 entries balance keys between different region servers of PIT database to ensure that keys of different region servers are unique for the same point in time data.

In the illustrated embodiment, PIT database 160 stores binlogs in binlog table 180 according to binlog table schema 335. Binlog table schema 335 stores binlogs as key-value pairs, with keys having the same format as the snapshot table schema 325 and values that store one or more changed production data values (i.e., new values for records stored in production database 150).

PIT database 160, in the illustrated embodiment, periodically generates snapshots from binlogs stored in binlog table 180 and stores these newly generated snapshots in snapshot table 170. As one example, if a set of 20 new binlogs for a given production database record has been appended by PIT ingestion module 140 (shown in FIG. 1) to binlog table 180, then PIT database 160 aggregates these 20 binlogs into a new snapshot during a snapshot generation process 322 and stores this new snapshot in snapshot table 170. In some embodiments, PIT database 160 performs snapshot generation process 322 to generate snapshots from binlogs stored in PIT binlog table 180 for storage in PIT snapshot table 170 on a daily basis.

FIG. 3B is a diagram illustrating an example binlog table entry. In the illustrated embodiment, an example binlog table entry 332 that may be stored by binlog table 380 is shown. For example, table entry 332 includes several attribute fields 302 with various values 304. In the illustrated embodiment, entry 332 includes the following fields 302: process time, database operation, primary key, data field, and data value. The corresponding values 304 for these fields 302 are shown in FIG. 3B. For example, entry 332 was processed on Jul. 19, 2024 and is an upsert database operation. Further, entry 332 includes the primary key value of "6523455677888890655," a data field "name," and a data value "Larry." In this example, entry 332, stored in binlog table 380 (shown in FIG. 3A), is one example of a change made to the data field of a record of production database 150. Specifically, in this example, the data field 302 "name" of the production record is updated (i.e., changed) to the data value 304 "Larry."

As discussed above with reference to FIG. 1, success binlog module 130 may determine that an upsert database operation performed on production database 150 is successful. In response to determining the success, PIT ingestion module 140 appends a new binlog, generated by success binlog module 130, to PIT binlog table 180 as a new entry. New binlog table entry 332 shown in FIG. 3B is one example of this new appended entry. In various embodiments, entry 332 is generated by database system 110 (shown in FIG. 1) after an update and delete database operation has been performed on a production database record corresponding to "Larry."

In various embodiments, when generating binlogs, success binlog module 130 (shown in FIG. 1) publishes only the field of a record that was altered by database system 110. For example, for a given record that includes two different fields, name and company, if only the name is changed during the upsert operation discussed above, then success binlog module 130 generates a binlog with a value that only includes the new name that was changed. In this way, the binlog table 180 stores only one of potentially hundreds or thousands of attribute fields corresponding to a single production record. In this example, instead of storing a copy of hundreds of attribute fields, PIT database 160 stores only the altered attribute field in its binlog table 180. In various embodiments, this may advantageously reduce storage space and costs.

Example Replay Engine

Figure 4:
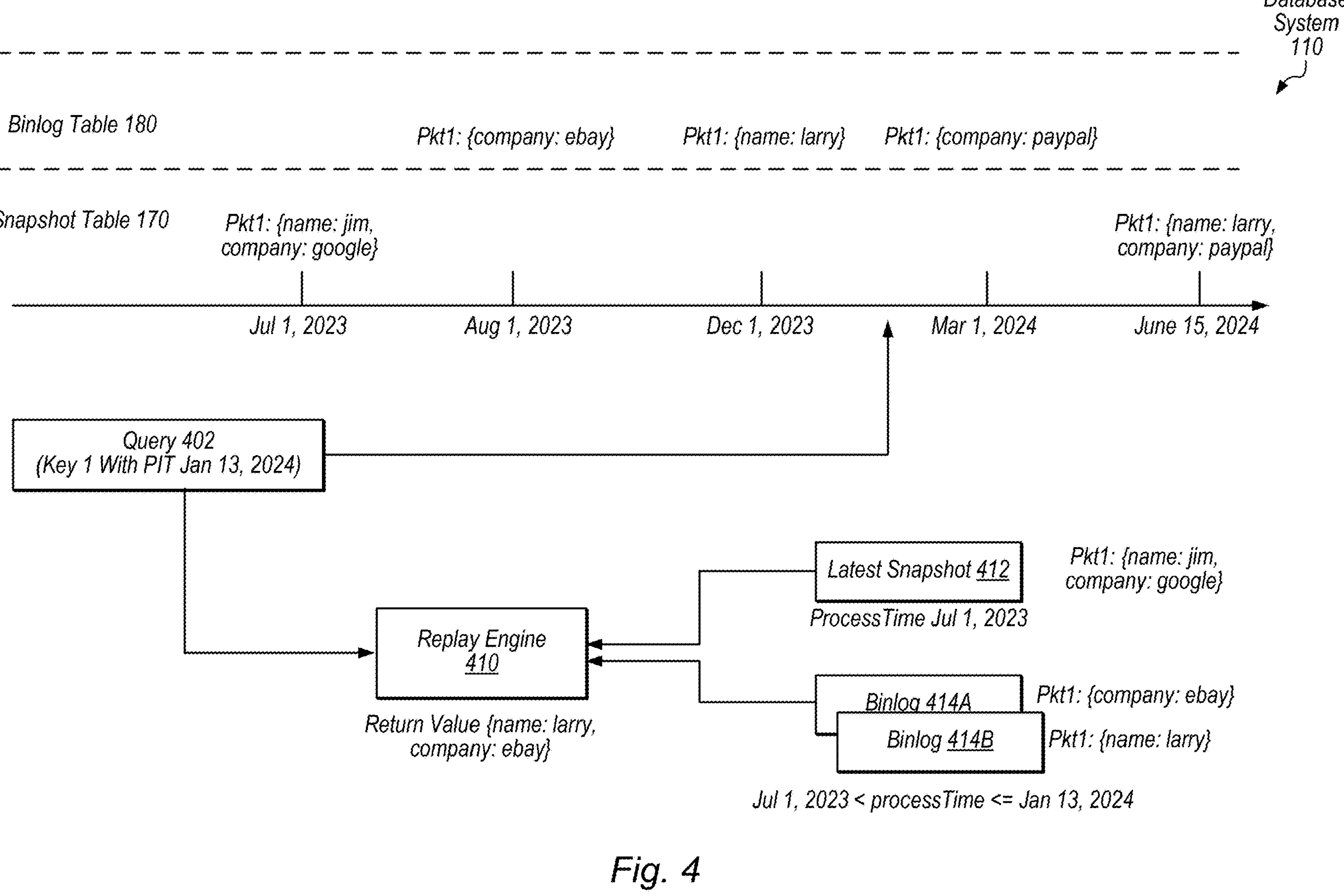
FIG. 4 is a diagram illustrating example replay engine execution in response to a query, according to some embodiments.

FIG. 4 is a diagram illustrating example replay engine execution in response to a query. In the illustrated embodiment, database system 110 receives a query 402 e.g., from a computer system 102 (shown in FIG. 1). In various embodiments, database system 110 employs replay engine 410 to service PIT queries from computer systems by querying PIT snapshot table 170 and binlog table 180. These queries retrieve a latest snapshot and one or more binlogs with timestamps falling between the latest snapshot and the point in time specified in a given query. In various embodiments, after retrieving the latest snapshot and one or more binlogs, replay engine 410 replays the one or more binlogs onto the snapshot to generate a final PIT data result.

In the illustrated embodiment, query 402 includes a request to retrieve PIT data corresponding to a primary key 1 from a point in time of Jan. 13, 2024. In response to receiving a PIT query 402, database system 110 inputs parameters of query 402 into a replay engine 410. Reply engine 410 retrieves and combines a latest snapshot 412 and two binlogs, binlog 414A and binlog 414B, from PIT database 160 (shown in FIG. 1). For example, based on the timestamp of Jan. 13, 2024, specified in query 402, replay engine 410 executes to retrieve a latest snapshot 412 from snapshot table 170 that was captured on Jul. 1, 2023. (Note that snapshot 412 is a most recent snapshot captured by the database system 110 before the query point in time of Jan. 13, 2024.) Replay engine 410 further executes to retrieve binlogs with timestamps between the latest snapshot 412 point in time of Jul. 1, 2023, and the query point in time of Jan. 13, 2024. In this example, binlog 414A and binlog 414B, which correspond to timestamps of Aug. 1, 2023, and Dec. 1, 2023, both satisfy the replay engine query 410 parameters of falling between the dates Jul. 1, 2023, and Jan. 13, 2024. The example timeline shown in the top portion of FIG. 4 illustrates that binlogs 414A and 414B fall between the snapshot timestamp and the query PIT.

After retrieving latest snapshot 412 and binlogs 414A and 414B, replay engine 410 combines binlogs 414A and 414B on top of latest snapshot 412 to generate an up-to-date record. The up-to-date record includes the values: {name: Larry, company: eBay}. In the illustrated embodiment, latest snapshot 412 was captured on Jul. 1, 2023, according to the example timeline shown for snapshot table 170 and binlog table 180 at the top portion of FIG. 4. Latest snapshot 412 captures the data stored for a record corresponding to primary key 1. This latest snapshot 412 includes record values: {name: Jim, company: Google}.

As shown in the illustrated embodiment, binlog 414A for primary key 1 includes an updated company for the record. For example, the company attribute value for this record was updated on Aug. 1, 2023, to be "eBay" instead of "Google." Similarly, binlog 414B for primary key 1 includes an updated name for the record being retrieved by database system 110. For example, the name attribute value for this record was updated on Dec. 1, 2023, to be "Larry" instead of "Jim." Due to replay engine 410 combining the attribute values stored in latest snapshot 412 and binlogs 414A and 414B, the resulting attribute values for the retrieved record are "Larry" and "eBay." For example, both the name and company for the record corresponding to primary key 1 have been updated since Jul. 1, 2023. In some embodiments, the implementation of snapshots and binlogs in combination with the replay engine discussed above with reference to FIG. 4 reduces the amount of storage needed to implement a PIT database.

Example Missing PIT Data

Figure 5:
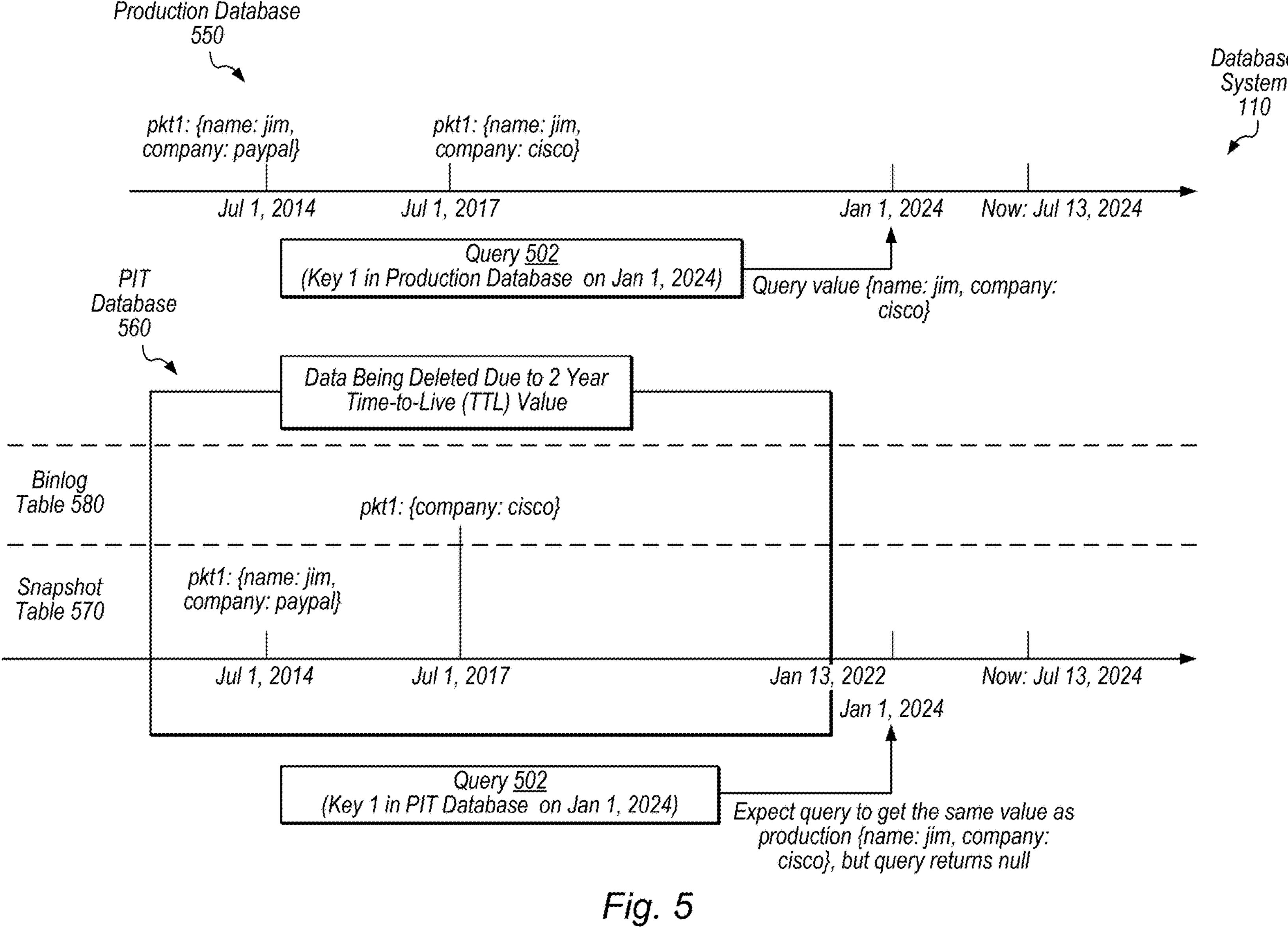
FIG. 5 is a diagram illustrating an example query miss on a PIT database storing data according to native TTL configurations, according to some embodiments.

FIG. 5 is a diagram illustrating an example query miss on a PIT database storing data according to native TTL configurations. In the illustrated embodiment, database system 110 executes a query 502 on both production database 150 and PIT database 160 to retrieve data stored in a record corresponding to primary key 1 at a particular point in time: Jan. 1, 2024. Due to the PIT database 160 in the illustrated example being implemented using native TTL values (e.g., TTL of 2 years for both binlog table 180 and snapshot table 170), however, these two identical queries return different results. For example, when query 502 is executed on PIT database 160, this query returns a null value due to data that is older than two years being deleted from PIT database 160.

In the illustrated embodiment, when database system 110 executes query 502 for primary key 1 and a point in time of Jan. 1, 2024, on production database 150, this query returns the record value: {name: Jim, company: Cisco}. This returned value is the up-to-date production data value for the record corresponding to primary key 1, since this record was updated on Jul. 1, 2017, to change the company listed for Jim from PayPal to Cisco.

In contrast, when database system 110 executes query 502 on PIT database 160, this query is expected to get the same value as that returned from production database 150. As shown in the illustrated embodiment, however, the query on PIT database 160 returns a null value, because there is nothing stored in PIT database 160 for primary key 1 prior Jan. 13, 2022 (2 years before a current time Jul. 13, 2024). This null value for primary key 1 is due to PIT database 160 implementing a 2-year native TTL for both binlog table 180 and snapshot table 170. For example, as shown in FIG. 5, the data within the box labeled "data being deleted due to 2-year TTL value" (i.e., PIT data prior to Jan. 13, 2022) that used to be stored in PIT database 160 gets deleted by database system 110 on Jan. 13, 2024. That is, this data is deleted since it includes timestamps that are two or more years old. In this example, unless a record has been changed in the past two years (after Jan. 13, 2022), no information about that record will be available in the PIT data storage. As discussed above with reference to FIG. 1 and below with reference to an example illustrated in FIG. 6, to solve this problem, the disclosed techniques implement customized TTL values for PIT snapshot table 170 and PIT binlog table 180, as well as a customized snapshot dump value for dumping production snapshots into the PIT snapshot table 170.

Example K-Years of PIT Data Storage

Figure 6:
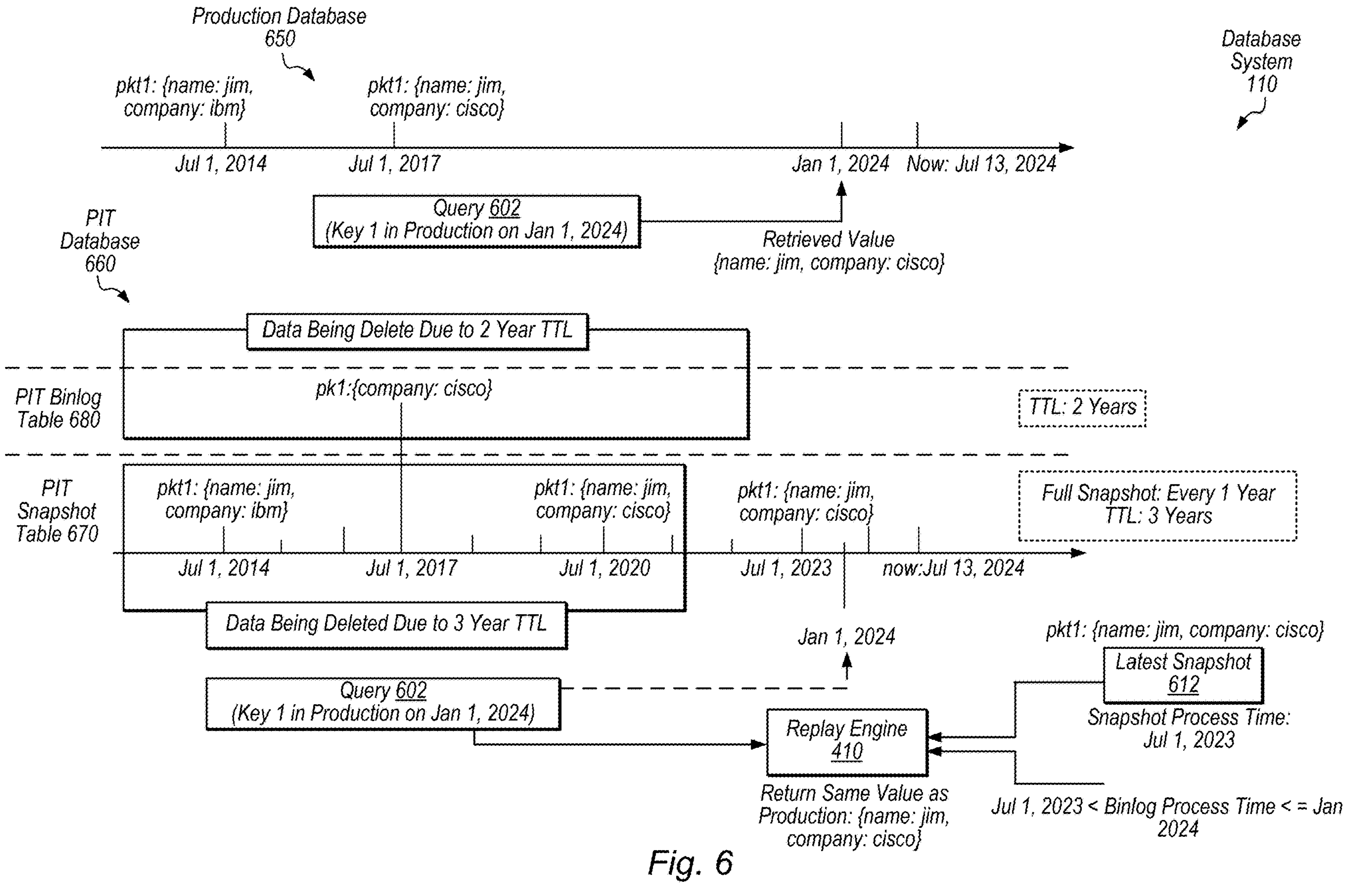
FIG. 6 is a diagram illustrating example query execution on a PIT database storing data according to values calculated using the configuration algorithms shown in FIG. 2, according to some embodiments.

FIG. 6 is a diagram illustrating example query execution on a PIT database storing data according to values calculated using the configuration algorithms shown in FIG. 2. In the illustrated embodiment, database system 110 implements a query 602 separately on both production database 650 and PIT database 660, respectively. While production database 650 is implemented using a native TTL value (e.g., 10 years), PIT database 660 is implemented using the disclosed customized TTL and production snapshot dump values. Unlike the PIT database 560 that is shown in FIG. 5 and is implemented using a native 2-year TTL value, the PIT database 660 shown in FIG. 6 is implemented using unique TTL values for each of PIT binlog table 680 and PIT snapshot table 670. For example, the TTL for PIT binlog table 680 is 2 years, the TLL for PIT snapshot table 670 is 3 years, and a full dump of snapshots from production to PIT snapshot table 670 is performed every year. Note that the parameters for query 602 and query 502 (discussed above with reference to FIG. 5) are identical, but return different results due to the updated, customized TTL values implemented for PIT database 660.

In the illustrated embodiment, database system 110 executes query 602 on production database 650 to retrieve the following values from the production record corresponding to primary key 1 and the point in time of Jan. 1, 2024:{name: Jim, company: Cisco}. Similarly, database system 110 also executes query 602 on PIT database 660 to retrieve the following values from the PIT record corresponding to primary key 1 and the point in time of Jan. 1, 2024:{name: Jim, company: Cisco}. For example, in the illustrated embodiment, database system 110 executes replay engine 410 to retrieve a latest snapshot 612 from PIT snapshot table 670 which corresponds to primary key 1 and a time at which the snapshot was processed (i.e., the snapshot was generated on Jul. 1, 2023). Replay engine 410 also executes to retrieve any binlogs that have timestamps falling between the snapshot timestamp of Jul. 1, 2023, and the point in time specified in query 602 (i.e., Jan. 1, 2023). No binlogs exist or are stored in PIT binlog table 680 for this time window. Therefore, in the illustrated embodiment, replay engine 410 returns the following record values in the latest snapshot 612 (e.g., since no changes have been made to this record since the latest snapshot 612 was captured): {name: Jim, company: Cisco}.

In FIG. 6, even though no changes were made to the database record corresponding to primary key 1 in the last two years (and, thus, no new binlogs were stored in PIT binlog table 680), the new customized PIT snapshot TTL value and the yearly snapshot dump ensure that at least one latest snapshot was available to be retrieved from PIT database 660 by query 602. For example, database system 110 performs full snapshot dumps from production database 650 to PIT snapshot table 670 every year. This yearly snapshot dump guarantees that primary keys of the production database have at least one snapshot stored in PIT snapshot table 670. Further, PIT snapshot table 670 maintains records from 3 years ago according to the customized PIT snapshot TTL value (calculated by database system 110 as discussed above with reference to FIG. 2), which guarantees that queries specifying points-in-time within the past 2 years will retrieve at least one snapshot from PIT snapshot table 670.

In various embodiments, implementing the disclosed customized TTL and snapshot dump values allows database systems to reduce storage capacity for both PIT snapshot tables and PIT binlog tables. As one example, using the disclosed TTL values, the PIT binlog table storage capacity is approximately 100 terabytes, and the PIT snapshot table is approximately 1.4 petabytes. Without implementing the disclosed storage saving techniques, the PIT storage system would need to store multiple additional years of changes made to historical production data. This, in turn, would lead to the amount of storage resources necessary to maintain a PIT database to be on the level of 1.4 petabytes*N years, where N is the number of additional years that PIT data would need to be stored for if the disclosed TTL time saving techniques were not implemented. In addition, the disclosed techniques may advantageously improve the accuracy of regression models trained using PIT data retrieved from a PIT database (e.g., PIT database 160 shown in FIG. 1). As one example, regression models trained on PIT data retrieved after implementation of the disclosed techniques are between 2% and 35% more accurate than regression models trained on PIT data retrieved from PIT database 160 using native TTL values.

Example Methods

FIG. 7 is a flow diagram illustrating an example method for maintaining a PIT database according to customized TTL values, according to some embodiments. The method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, database system 110 performs the elements of method 700.

At 710, in the illustrated embodiment, a database system maintains a point in time (PIT) database. In some embodiments, the maintaining includes executing, according to a snapshot dump TTL of K/2, a dump of production snapshots from a production database maintained by the database system into the snapshot table of the PIT database, where the production snapshots correspond to database changes specified in one or more database operations and executed by a production ingestion service of the database system on the production database. In some embodiments, the maintaining further includes executing, according to a snapshot dump TTL of K/2, a dump of production snapshots from a production database into the snapshot table of the PIT database.

At 720, the database system maintains the PIT database by updating a snapshot table included in the PIT database according to a snapshot table time-to-live (TTL) value of 3K/2, where the updated snapshot table is configured to provide accurate data for queries up to K years prior to PITs at which the queries are executed. In some embodiments, K is a number of years greater than or equal to one. In some embodiments, updating the snapshot table included in the PIT database further includes calculating the TTL value for the snapshot table according to a K value specified by a system administrator of the database system.

At 730, the database system maintains the PIT database by updating a binlog table included in the PIT database according to a binlog table TTL value of K. In some embodiments, respective binlog records stored in the binlog table indicate one or more changes made to a given database record stored in a production database maintained by the database system, where a given snapshot indicates a state of a database record at a given point in time.

At 740, the database system receives, from a computer system, a request to access PIT data stored in the PIT database. In some embodiments, the database system maintains records in a production database with timestamps that are a plurality of years before timestamps of records maintained by the database system in the PIT database. In some embodiments, the PIT database stores records indicating changes made to production records during a previous K years.

At 750, the database system accesses the PIT database based on a timestamp specified in the request. In some embodiments, the accessing includes querying the snapshot table included in the PIT database to retrieve a latest snapshot that corresponds to a point in time that is prior to the timestamp. In some embodiments, the accessing further includes querying the binlog table included in the PIT database to retrieve one or more binlogs corresponding to points-in-time between the latest snapshot and the timestamp. In some embodiments, the accessing further includes replaying the one or more binlogs to the latest snapshot to generate the set of PIT data that corresponds to the timestamp specified in the request.

At 760, the database system transmits, to the computer system, a set of PIT data that corresponds to the timestamp specified in the request and includes accurate data for K years prior to the timestamp specified in the request. In some embodiments, the database system queries the PIT database based on a date range within the last K years. In some embodiments, the database system trains a machine learning model using a plurality of records retrieved from the PIT database via the querying. In some embodiments, the plurality of records retrieved from the PIT database include key-value pairs having keys that include timestamps that fall within the date range specified by the database system when performing the querying.

In some embodiments, the database system executes, based on a plurality of requests received from one or more computer systems, a plurality of database operations on a production database. In some embodiments, the database system updates, based on the executing, the binlog table. In some embodiments, the updating includes appending, via a PIT ingestion service of the database system, a plurality of binlogs onto the binlog table based on a binlog dump of successful changes made to the production database according to the plurality of database operations. In some embodiments, updating the snapshot table includes removing one or more snapshots stored in the snapshot table that include keys with point in time values that are older than a point in time specified by the snapshot table TTL value.

FIG. 8 is a flow diagram illustrating an example method for servicing PIT database queries while maintaining PIT and production databases according to customized TTL values, according to some embodiments. The method 800 shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, database system 110 performs the elements of method 800.

At 810, in the illustrated embodiment, a database system executes, according to a snapshot dump time-to-live (TTL) calculated using a first algorithm, a dump of production snapshots stored in the production database into the PIT snapshot table of the PIT database, where a given snapshot stores a plurality of binlogs. In some embodiments, executing the dump includes converting the production snapshots into PIT snapshot format according to a schema of the PIT snapshot table. In some embodiments, the converting includes altering private keys of the production snapshots to a format corresponding to the schema of the PIT snapshot table. In some embodiments, the database system calculates the snapshot dump TTL using the first algorithm including determining to perform the snapshot dump TTL every K/2 years. In some embodiments, K is a real number with a value greater than or equal to one.

At 820, the database system updates the PIT snapshot table according to a PIT snapshot TTL calculated using a second algorithm. In some embodiments, the database system calculates the PIT snapshot TTL using the second algorithm including determining that the PIT snapshot TTL for the PIT snapshot table is 3K/2 years.

At 830, the database system updates the PIT binlog table according to a PIT binlog TTL calculated using a third algorithm. In some embodiments, the database system calculates the PIT binlog TTL using the third algorithm including determining that the PIT binlog TTL for the PIT binlog table is K years.

At 840, during the executing, the updating the PIT snapshot table, and the updating the PIT binlog table, the database system services a plurality of queries for data stored in the PIT database. In some embodiments, the plurality of queries for data stored in the PIT database are received from a plurality of computer systems. In some embodiments, the plurality of computer systems are utilized by a plurality of end users.

At 850, when servicing a given query of the plurality of queries, the database system accesses the PIT database at least to retrieve a latest snapshot and one or more binlogs from the PIT binlog table. In some embodiments, the latest snapshot corresponds to a point in time prior to a timestamp specified in the given query and the one or more binlogs correspond to points-in-time between the latest snapshot and the timestamp.

In addition to methods 700 and 800 and its variants, non-transitory, computer-readable media storing program instructions executable to implement such methods are also contemplated, along with systems configured to implement these methods.

The various techniques described herein may be performed by one or more computer programs. The term "program" is to be construed broadly to cover a sequence of instructions in a programming language that a computing device can execute. Database system 110, shown in FIG. 1, may also be referred to herein as a "computer system" and is one example of the computing device that may execute various sequences of instructions that make up a program. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" to facilitate execution of the program instructions by a computer system, such as database system 110 or one or more computer systems 102. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. These phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system such as database system 110) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to be "executable" to perform certain functionality, whether or not current software configuration parameters permit such execution. Executability means that when and if the instructions are executed, they perform the functionality in question.

The present disclosure refers to various software operations that are performed in the context of one or more computer systems. Production ingestion service 120 can each execute on respective computer systems, for example. Similarly, production database 150 and PIT database 160 can be implemented on the same computer system or different computer systems. For example, production ingestion service 120 and production database 150 may be implemented by a first database system and PIT ingestion service 140 and PIT database 160 may be implemented by a second, different database system. Each of these components, then, is implemented on physical structure (i.e., on computer hardware).

In general, any of the services or functionalities of a software development environment described in this disclosure can be performed by a host computing device, which is any computer system, such as database system 110, that is capable of connecting to a computer network. A given host computing device can be configured according to any known configuration of computer hardware. A typical hardware configuration includes a processor subsystem, memory, and one or more I/O devices coupled via an interconnect. For example, database system 110 receives batch queries from one or more client computing devices via an interconnect corresponding to an I/O device of database system 110 and stores data in a memory, such as production database 150 or PIT database 160, as shown in FIG. 1. A given host computing device may also be implemented as two or more computer systems operating together.

The processor subsystem of the host computing device may include one or more processors or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

maintaining, by a database system, a point in time (PIT) database, wherein the maintaining includes:

updating a snapshot table included in the PIT database according to a snapshot table time-to-live (TTL) value of 3K/2, wherein the updated snapshot table is configured to provide accurate data for queries up to K years prior to PITs at which the queries are executed, and wherein K is a number of years greater than or equal to one;

updating a binlog table included in the PIT database according to a binlog table TTL value of K;

receiving, by the database system from a computer system, a request to access PIT data stored in the PIT database;

accessing, by the database system based on a timestamp specified in the request, the PIT database, including generating a set of PIT data by accessing the snapshot table and the binlog table based on a point in time prior to the timestamp; and transmitting, by the database system to the computer system, the set of PIT data, wherein the set of PIT data includes accurate data for K years prior to the timestamp specified in the request.

2. The method of claim 1, wherein accessing the PIT database includes:

querying the snapshot table included in the PIT database to retrieve a latest snapshot that corresponds to a point in time that is prior to the timestamp;

querying the binlog table included in the PIT database to retrieve one or more binlogs corresponding to points-in-time between the latest snapshot and the timestamp; and replaying the one or more binlogs to the latest snapshot to generate the set of PIT data that corresponds to the timestamp specified in the request.

3. The method of claim 1, wherein respective binlog records stored in the binlog table indicate one or more changes made to a given database record stored in a production database maintained by the database system, and wherein a given snapshot indicates a state of a database record at a given point in time.

4. The method of claim 1, wherein the maintaining further includes:

executing, according to a snapshot dump TTL of K/2, a dump of production snapshots from a production database maintained by the database system into the snapshot table of the PIT database, wherein the production snapshots correspond to database changes specified in one or more database operations and executed by a production ingestion service of the database system on the production database.

5. The method of claim 1, wherein updating the snapshot table included in the PIT database further includes calculating the TTL value for the snapshot table according to a K value specified by a system administrator of the database system.

6. The method of claim 1, wherein the database system maintains records in a production database with timestamps that are a plurality of years before timestamps of records maintained by the database system in the PIT database, and wherein the PIT database stores records indicating changes made to production records during a previous K years.

7. The method of claim 1, further comprising:
querying, by the database system based on a date range within the last K years, the PIT database; and
training, by the database system using a plurality of records retrieved from the PIT database via the querying, a machine learning model, wherein the plurality of records retrieved from the PIT database include key-value pairs having keys that include timestamps that fall within the date range specified by the querying.

8. A non-transitory computer-readable medium having program instructions stored therein that are executable by a database system to perform operations comprising:
maintaining a point in time (PIT) database, wherein the maintaining includes:
updating a snapshot table included in the PIT database according to a snapshot table time-to-live (TTL) value of 3K/2, wherein the updated snapshot table provides accurate data for queries up to K years prior to PITs at which the queries are executed, and wherein K is a number of years greater than or equal one;
updating a binlog table included in the PIT database according to a binlog table TTL value of K;
receiving, from a computer system, a request to access PIT data stored in the PIT database;
accessing, based on a timestamp specified in the request, the PIT database, including accessing one or both of the snapshot table and the binlog table based on a point in time prior to the timestamp;
generating, based on accessing one or both of the snapshot table and the binlog table, a set of PIT data corresponding to the timestamp specified in the request; and
transmitting, to the computer system, the set of PIT data, wherein the set of PIT data includes accurate data for K years prior to the timestamp specified in the request.

9. The non-transitory computer-readable medium of claim 8, wherein the maintaining further includes:
executing, according to a snapshot dump TTL of K/2, a dump of production snapshots from a production database into the snapshot table of the PIT database.

10. The non-transitory computer-readable medium of claim 8, wherein accessing the PIT database includes:
querying the snapshot table included in the PIT database to retrieve a latest snapshot that corresponds to a point in time that is prior to the timestamp;
querying the binlog table included in the PIT database to retrieve one or more binlogs corresponding to points-in-time between the latest snapshot and the timestamp; and
replaying the one or more binlogs to the latest snapshot to generate the set of PIT data that corresponds to the timestamp specified in the request.

11. The non-transitory computer-readable medium of claim 8, further comprising:
executing, based on a plurality of requests received from one or more computer systems, a plurality of database operations on a production database; and
updating, based on the executing, the binlog table, wherein the updating includes appending, via a PIT ingestion service of the database system, a plurality of binlogs onto the binlog table based on a binlog dump of successful changes made to the production database according to the plurality of database operations.

12. The non-transitory computer-readable medium of claim 8, wherein updating the snapshot table included in the PIT database further includes calculating the TTL value for the snapshot table according to a K value specified by a system administrator of the database system.

13. The non-transitory computer-readable medium of claim 8, wherein the database system maintains records in a production database with timestamps that are a plurality of years before timestamps of records maintained by the database system in the PIT database, and wherein the PIT database stores records indicating changes made to production records during a previous K years.

14. The non-transitory computer-readable medium of claim 8, wherein updating the snapshot table includes removing one or more snapshots stored in the snapshot table that include keys with point in time values that are older than a point in time specified by the snapshot table TTL value.

15. A system comprising:
a production database;
a point in time (PIT) database that includes a PIT snapshot table and a PIT binlog table;
a processor; and
a non-transitory computer-readable medium having stored thereon instructions that are executable by the processor to cause the system to perform operations comprising:
executing, according to a snapshot dump time-to-live (TTL) calculated using a first algorithm, a dump of production snapshots stored in the production database into the PIT snapshot table of the PIT database, wherein a given snapshot stores a plurality of binlogs;
updating, according to a PIT snapshot TTL calculated using to a second algorithm, the PIT snapshot table;
updating, according to a PIT binlog TTL calculated using to a third algorithm, the PIT binlog table, wherein the second algorithm is based on the PIT binlog TTL; and
during the executing, the updating the PIT snapshot table, and the updating the PIT binlog table, servicing a plurality of queries for data stored in the PIT database, wherein servicing a given query of the plurality of queries includes:
accessing the PIT database at least to retrieve a latest snapshot and one or more binlogs from the PIT binlog table, wherein the latest snapshot corresponds to a point in time prior to a timestamp specified in the given query and the one or more binlogs correspond to points-in-time between the latest snapshot and the timestamp.

16. The system of claim 15, wherein executing the dump includes converting the production snapshots into PIT snapshot format according to a schema of the PIT snapshot table, and wherein the converting includes altering private keys of the production snapshots to a format corresponding to the schema of the PIT snapshot table.

17. The system of claim 15, wherein the instructions are further executable to cause the system to perform operations comprising:

calculating the snapshot dump TTL using the first algorithm including determining to perform the snapshot dump TTL every K/2 years, wherein K is a real number with a value greater than or equal to one.

18. The system of claim 15, wherein the instructions are further executable to cause the system to perform operations comprising:

calculating the PIT snapshot TTL using the second algorithm including determining that the PIT snapshot TTL for the PIT snapshot table is 3K/2 years, wherein K is a real number with a value greater than or equal to one.

19. The system of claim 15, wherein the instructions are further executable to cause the system to perform operations comprising:

calculating the PIT binlog TTL using the third algorithm including determining that the PIT binlog TTL for the PIT binlog table is K years, wherein K is a real number with a value greater than or equal to one.

20. The system of claim 15, wherein the updating the PIT snapshot table includes removing one or more snapshots stored in the PIT snapshot table that include keys with PIT values that are older than the PIT specified by the PIT snapshot TTL.

* * * * *